July 25, 1967  R. P. BUSTAMANTE  3,332,108
TIP FOR DISPENSER OF MELTED MATERIALS
Filed Oct. 20, 1965

INVENTOR
ROBERTO P. BUSTAMANTE

BY
Cushman, Darby & Cushman
ATTORNEYS

July 25, 1967  R. P. BUSTAMANTE  3,332,108
TIP FOR DISPENSER OF MELTED MATERIALS
Filed Oct. 20, 1965
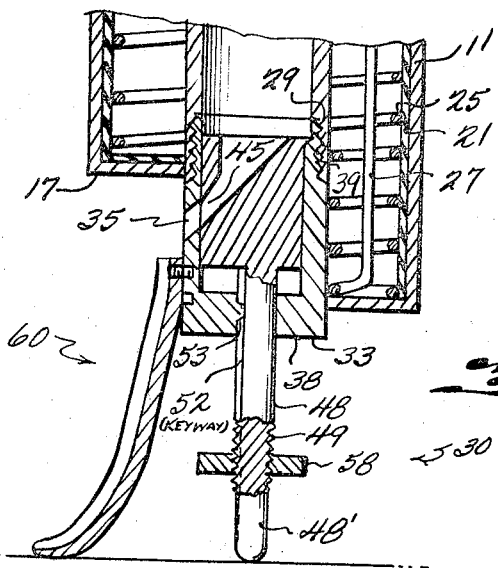
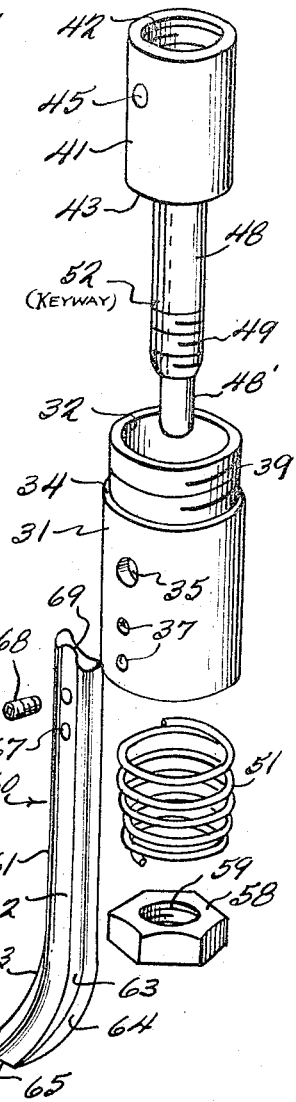
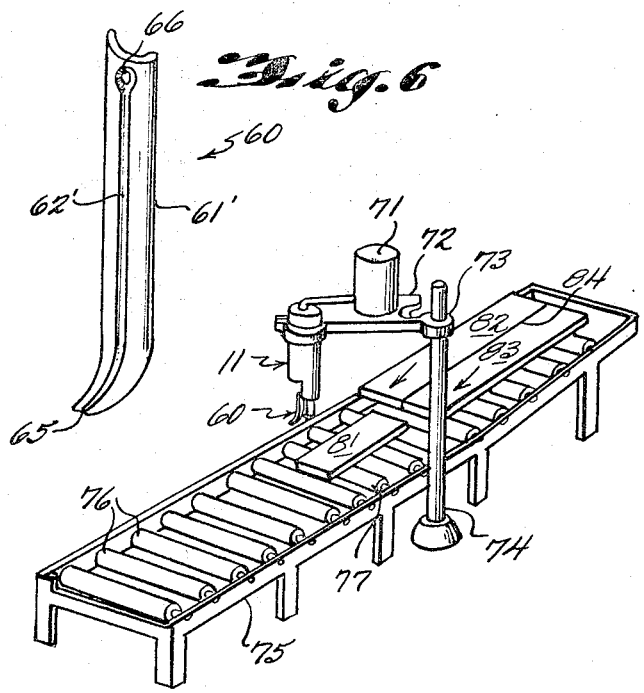
INVENTOR
ROBERTO P. BUSTAMANTE

United States Patent Office 3,332,108
Patented July 25, 1967

3,332,108
TIP FOR DISPENSER OF MELTED MATERIALS
Roberto P. Bustamante, 4a Calle Poniente 40,
Santa Ana, El Salvador
Filed Oct. 20, 1965, Ser. No. 498,792
5 Claims. (Cl. 18—3.5)

This invention relates to improvements in the dispensing of molten materials. More particularly, this invention relates to an improved dispenser tip or applicator for the accurate deposition of molten or melted materials such as glue, wax, resin, solder and molten metals generally, from melting or fusing devices.

Solder guns and devices for the spot application of solders, waxes and resins are known. Such devices are used for example, to apply a measured quantity of wax or resin to seal an object from air, moisture, or electrical discharge, as well as to provide a spot of solder to secure an electrical or fluid connection. Such devices are used industrially, in the arts and crafts, in advanced technology, as well as artistically in fabric decoration and the like. Typically, the molten material is discharged from a melting chamber and through some sort of valve, to the area of application where the molten material is allowed to flow onto its objective, followed by cooling to solidify. The molten material is difficult to manipulate, and great skill must be developed in order to apply an appropriate amount of the molten material to the object being treated, such that the desired coating or sealing effect will be obtained, prior to cooling and solidification. In decorative work, it is advisable to apply too little molten material rather than an excess, because mistakes cannot be easily corrected without damaging the work. In some electrical and fluid connections, where space permits, it is desirable to apply an excess of molten material, to ensure the obtaining of the proper bonding or sealing effect. Care must still be employed, however, because it is the nature of such materials that they are not deformable or malleable in the solid state. Thus, a poor job cannot be corrected, and it is usual that the molten material must be correctly applied in all instances.

Molten material dispensers are also known wherein the dispenser is provided with an applicator tip, to facilitate accurate deposition of the molten material. These combined dispensers and applicators have advanced to a high degree of proficiency in the arts, such that the applicator tips now have many forms. Presently known applicators may have integral heating coils and refined means for heat and cooling controls, integral with the material fusing portion of the dispenser. Many advanced applicators are now bulky and cumbersome to the extent that they again require great skill to promote accurate deposition. Other known applicators are entirely satisfactory in operation, but are often complex, and formed from exotic materials, such that they are generally objectionable from the standpoint of high cost. Further, the known applicators are very precise in nature, having very specific end uses. Thus, the material being applied, and the substrate being treated now dictate the form the dispenser and applicator are to take. Practically speaking, there is no generally useful applicator and there is no applicator that can generally be combined with any given molten material dispenser. Further, some applicators have now become so compex, refined and advanced, that they tend to create new problems because of their cumbersome nature.

It is therefore a principal object of this invention to provide a new and simple dispenser tip for molten materials that will have general utility in combination with a device for dispensing molten materials, while avoiding present applicator defects.

It is an important object of this invention to provide an applicator device of simple, disposable construction, that can be combined with presently known molten material dispensers and applicators.

It is therefore another principal object of this invention to provide molten material dispensers with a dispenser tip for the accurate deposition of the molten material.

It is another object of this invention to provide a new dispenser tip for molten materials that can be added to known dispensing devices without great modification.

It is a further object of this invention to provide a flexible dispenser tip that will facilitate the accurate application of molten materials.

It is still a further object of this invention to provide a readily disposable dispenser tip of low cost and economical construction that can be readily disposed of after use.

Other and further objects of this invention, together with an appreciation for the advantages thereof, will become increasingly apparent as this description proceeds.

The success of the invention lies in the discovery that a small, flexible, and disposable dispenser tip can be added to molten material dispensers, such as a solder gun, wax stylus, and the like, to facilitate the accurate application of molten materials. The new dispenser tip is provided with an open trough or canal in which the material may flow down to a small flexible blade end from which the molten material may flow on to the work.

In carrying out the invention there is provided a receptacle for carrying a quantity of material to be fused or melted. The receptacle is arranged with outlet means at the lowermost part and a supply opening at the top provided with a cover, a valve mechanism being provided to control the outlet means which is normally urged to closing position and is adapted to be actuated exteriorly of the receptacle to move it to outlet opening position. An electric heating unit is mounted upon the receptacle, preferably in the region of the outlet means of the receptacle, in isolated relation to the material in the receptacle for fusing the material in the receptacle. A casing may be provided to enclose the heating unit and confine the heat to the receptacle and prevent dissipation of the heat and injury to the operator as by burning.

The understanding of the invention will be facilitated by reference to the accompanying drawings, wherein:

FIGURE 4 is an enlarged fragmentary view, partly in cross section, of the lower portion of the device shown in FIGURE 2;

FIGURE 5 is an exploded perspective view of the dispensing components of the device shown in FIGURES 2 to 4;

FIGURE 6 is a modified dispenser tip embodiment according to the invention; and

FIGURE 7 is a perspective view of a conveyor type assembly line that can be used in conjunction with the dispenser tip modified molten material dispenser according to the invention.

Figure 1:
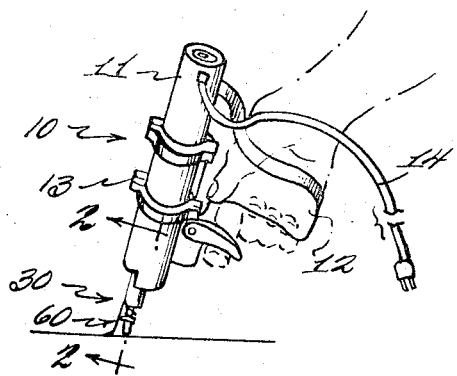
FIGURE 1 is a pictorial view showing a method of using a molten material dispenser modified according to the invention.

Turning now to the drawings: A typical molten material dispensing device or soldering iron is indicated generally by the reference numeral 10 in FIGURE 1. The device 10 may have a cylindrical body 11 and may be held by a gun-like grip 12 which is attached to the body 11 by means of suitable clamps 13. A heating element described hereinafter may be connected to a source of electric power via the insulated electrical cord 14. The construction of the device 10 will be better understood when reference is had to FIGURE 2 wherein the device 10 is shown in cross sectional elevation.

Figure 2:
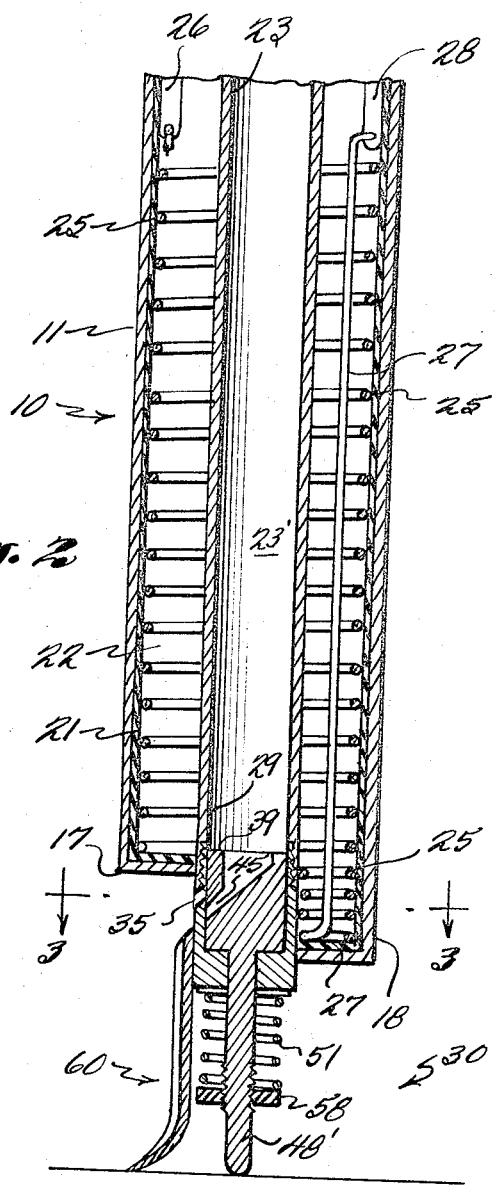
FIGURE 2 is a side elevation view, in cross section, of the lower end of a typical molten material dispenser that has been modified according to the invention.

In FIGURE 2 it will be seen that the cylindrical body 11 defines an opening 22 for receiving the coiled heating element 25. The heating element may be insulated from the metal body of the cylinder 11 by means of the non-metal insert 21. The cylindrical shape may terminate at 17, leaving a depending portion 18 of a shape to provide heat to the dispensing tip (described hereinafter) as is known in the art.

Figure 3:
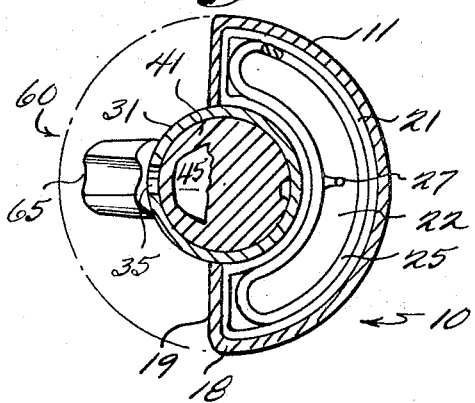
FIGURE 3 is a plan view, in cross section, taken along line 3—3 in FIGURE 2.

As shown in the plan view of FIGURE 3, the semicircular shape of the depending portion 18 receives double wound coils of the heating element described hereinafter.

Referring again to FIGURE 2, the heating element 25 may comprise a number of continuous helical coils surrounding the core 23 which defines a chamber 23' that is adapted to receive the material to be melted. Electrical energy may be supplied to the heating element 25 by means of the contact 26 which is coiled in a suitable manner until it reaches the bottom of the device where the coils are redirected into a straight wire 27 which in turn is connected to the other electrical terminal 28. The lower portion of core 23 may be threaded at 29 to receive the threads 39 of a piston type applicator indicated generally at 30. This applicator will be heated by the double wound coils of the heating device 25.

As is better shown in FIGURES 4 and 5, the piston actuated applicator 30 is defined by a cylindrical body 31 having a central opening 32 terminating at a bottom wall 33. The threaded portion 39 terminates at an enlarged shoulder 34 which will seat against the bottom of the core 23. A molten material dispensing opening is provided at 35 and suitable threaded holes may be provided at 37 to receive set screws, or the like, for attaching the device according to the invention.

The applicator member 30 is adapted to receive a piston-like plunger having a cylindrical body 41 provided with a valve opening 42 leading to the dispensing opening 45. The body 41 narrows at the shoulder 43, defining the cylindrical body 48 which is threaded at 49. If desired, the body 48 may again be narrowed at 48' to provide a rounded plunger tip. The threads 49 are adapted to receive threads 59 of nut 58. As is best shown in FIGURE 2, nut 58 serves to hold tension spring 51 against the underside 33 of cylinder 30. Proper alignment of the openings 35 and 45 may be assured by the provision of a keyway or slot 52 and key 53 shown in FIGURES 4 and 5. Other alignment means known in the art may also be found suitable.

It is to be understood that the invention is not limited to the molten material dispensing device and application just described, as these devices are known in great variety in the art. The foregoing description simply serves as a basis upon which the novel concept of the invention may be predicated.

The flexible molten material dispenser tip according to the invention is indicated generally by the reference numeral 60 in the several figures. As best shown in FIGURE 5, the dispenser tip comprises a body 61 having a shaped trough, groove, or canal 62 therein defined by the shoulders 63. The trough 62 leads to a curved tip portion 64 terminating at the tip end 65. If desired, screw receiving openings 67 may be provided to cooperate with screws 68 which will pass into suitable threaded openings 37 in the applicator member 31. However, other means of attachment, including pins, bolts, rivets, keys, clips and the like may also be found suitable.

As shown in the embodiment of FIGURE 6, the dispenser tip according to the invention may have a partially circular or curved configuration and an opening 66 may be provided to cooperate with the dispensing openings 35 and 45. The body 61' will have a generally smooth configuration except for the recessed grove area 62'. According to the illustrated embodiments of the invention, molten material will pass from the inside of chamber 23 into piston opening 42 and opening 45 through the applicator opening 35 and over the lip 69 of the dispenser tip, down the trough 62 and past the tip end 65, directly onto the substrate to be treated. It will be readily appreciated that the use of the dispenser tip 60, which is in the nature of a stylus or a pen point, will greatly facilitate the accurate application of molten materials to various substrates.

Turning now to FIGURE 7, there is shown a suitable conveyer-type assembly line for using the improvement according to the invention on a relatively automatic basis. The cylinder 11 with dispenser tip 60 may be continuously supplied with molten material from the container 71 mounted on platform 72 via the sliding ring connection 73 on the stand 74. The conveyer 75 may be provided with individual conveyer rolls 76 extending thereacross. A work platform 81 may be centrally disposed of the shortened conveyer rolls 77. Work pieces 82 and 83 will pass in the direction shown by the arrows beneath the molten material dispenser so that solder or other molten material may flow through the groove 62 of the dispenser tip onto the seam 84 between the work pieces 82 and 83.

It will be appreciated from the foregoing description that the objects of the invention have been achieved. Preferably, the device 60 is of disposable nature, so it may, if desired, be used a few times and then discarded. The device 60 may be cast or stamped from a variety of economical materials, including various metals and plastics that possess the properties desired according to the invention when in fabricated form. These properties will include relative inertness to the material being dispensed, so as not to interfere unduly with the desired physical and chemical properties of the solder, wax, resin or other molten material. The fabricated dispenser tip 60 should also be flexible and very economical in construction. This will permit its easy use, and ready disposal when it becomes worn, encrusted with the material being dispensed, or otherwise rendered unusable. Plastics and non metals are generally preferred materials of construction as they will not dissipate heat readily and thereby will not promote premature freezing of the material being dispensed.

It is elemental that the dispenser tip 60 according to the invention can be provided with a heating element to obviate premature freezing. This expedient would tend to increase cost and complexity however, and thus circumvent the purpose and objects of the invention. Any freezing can be avoided by dispensing at a slight superheat to bring the dispenser tip 60 up to the proper temperature to avoid freezing. The exact amount of superheat will depend on the relative heating coefficients of the material being melted and the dispenser tip 60, with some consideration given to the ambient conditions.

It will be appreciated, for example, that a dispenser tip 60 of relatively light mass, i.e. not more than about ten grams, can be heated about two hundred centigrade degrees from ambient temperature to the fusion temperatures of most solders, simply by conduction from the relatively greater mass of the heated dispensing device and molten solder, e.g., at least one kilogram, with relatively little added expenditure of heat. The desired dispenser tip temperature can then be maintained by a slight superheat of the molten solder as it flows thereover. This temperature will be at most about one to five centigrade degrees of superheat, depending on flow speed and heating effect of the solder on the dispenser tip.

A very suitable dispenser tip according to the invention may be one with a body of iron or aluminum provided with a sintered coating of an unctous resin at least covering the area of the trough 62. Teflon, Kel-F and the like resins of polytetrafluoroethylene and other polymerized halocarbons will be most suitable. Other materials of construction, including both body material, and any desired coating, may also be found suitable by those skilled in the art such that the invention should not be limited to those materials named above. It will be appreciated from the following description of the operation, that the material of the dispenser tip should be chosen so as to provide satisfactory flexibility. Usually, this will mean that the dispenser tip should be flexed with an effort of from about one ounce to at most about two pounds at maximum desired flexure.

The soldering device described above will work in the usual manner by placing the solder to be melted in the chamber 23'. The temperature of the device will be raised in the usual manner by the application of electrical power to the heating element 25. Heating should continue so that the material will pass through the fusion point and become liquid. As earlier explained, a few degrees of superheat should be applied. In this manner, the time taken for heating will permit heat to pass by conduction to the dispenser tip 60. Thereafter, the device 10 can be placed against the work so that the member 48' is in contact with the work. A small pressure on the device 10 will cause the member 48' to act on the nut 58 and the spring 51, to compress it and open the valve. This same action will cause the dispenser tip to come into contact with the work just as the openings 35 and 45 approach one another. Slightly more pressure on the member 48' will cause the dispenser tip 60 to flex as the openings 35 and 45 come in registration with one another so that molten material will flow thereout and onto the lip 69 or lip opening 66. The operator will at this time have the "feel" of the flexed dispenser tip against the work, so that, as molten material flows down the trough 62 or 62', he may begin to move the device and dispenser tip along the work to accurately place the molten material onto the work. With this type of operation, the relationship between the valve and dispenser tip shown in FIGURE 4 is to be preferred, whereat the dispenser tip is substantially flexed, when the openings 45 and 35 are in registration.

From the above it will be appreciated that the invention can be adapted to a standard electrically heated soldering iron which has a chamber within the soldering iron adapted to receive solder or similar material to be melted; that a closure is provided for the lower end of the chamber with valve means for controlling the flow of melted solder from the chamber onto the work: and that an entrance closure may be provided for the solder chamber for normally keeping the entrance closed so that the soldering iron can be laid upon a bench without danger of the solder running out of the entrance. This structure is then improved by the addition of a dispenser tip according to the invention which provides for the accurate deposition of molten materials.

Although a soldering iron and solder have been described, it is to be understood that such reference to solder is for illustrative purposes only, and that other materials, such as lead, wax, resins and the like can be equally well employed, and that the term solder is intended to include all such materials.

It will be understood that various changes in the detail of construction may be made without departing from the spirit or scope of the invention as defined by the appended claims.

What is claimed is:

1. A device for dispensing a molten material comprising a chamber, a hollow member mounted on said chamber with the interior of said hollow member being in communication with the interior of said chamber, said hollow member having a bottom wall with an opening therein and a side wall with a dispensing opening therein, said hollow member having a flexible dispenser tip mounted on the outer surface of said side wall adjacent said dispensing opening, a plunger mounted within said hollow member having an unrestricted opening therein which extends from an upper surface of the plunger to a side wall of the plunger, said plunger having an extension thereon which passes through and extends beyond said opening in the bottom wall of said hollow member, said extension having a spring thereon which extends between the bottom wall and an abutment on said extension biasing the extension outwardly whereby inward movement of the extension compresses the spring and brings the opening in the spring-biased plunger into communication with the dispensing opening in the side wall of the hollow member so that molten material can pass from the chamber to the flexible tip.

2. The device of claim 1 wherein proper axial alignment between the dispensing opening and said opening in the side wall of said plunger is assured by means of a key provided in said bottom wall opening which engages a slot in said extension.

3. The device of claim 1 wherein said opening in said spring-biased plunger slopes downwardly from the upper surface of the plunger to the side wall of the plunger and wherein said dispensing opening in the hollow member slopes downwardly at the same angle as said opening in the plunger whereby the flow of molten material from the chamber to the dispensing tip is facilitated.

4. The device of claim 1 wherein the flexible dispenser tip has a lip means for receiving molten material from the dispensing opening in said side wall of the hollow member, an outwardly curved end portion and a groove extending from said lip to said end portion.

5. The device of claim 1 wherein the flexible dispenser tip has an opening placed in registration with the opening in said side wall of the hollow member, an outwardly curved end portion and a groove extending from said opening to said end portion.

References Cited

UNITED STATES PATENTS

| 1,126,996 | 2/1915 | Hassler | 18—3.5 |
| 1,384,048 | 7/1921 | Coates | 118—3 |
| 1,661,599 | 3/1928 | Cynova. | |
| 1,728,043 | 9/1929 | Christman. | |
| 1,763,900 | 6/1930 | Morris. | |
| 2,150,155 | 3/1939 | Davis | 18—1 X |
| 2,933,061 | 4/1960 | Galer | 118—3 |
| 2,934,859 | 5/1960 | Little | 222—162 X |
| 3,023,726 | 3/1962 | Kamborian | 118—3.5 |

FOREIGN PATENTS

| 18,909 | 1905 | Sweden. |

WILLIAM J. STEPHENSON, *Primary Examiner.*